US009620151B1

(12) United States Patent
Shimazawa et al.

(10) Patent No.: US 9,620,151 B1
(45) Date of Patent: Apr. 11, 2017

(54) PLASMON GENERATOR WITH (111) ORIENTED TIP PORTION FOR THERMAL ASSISTED MAGNETIC RECORDING HEAD

(71) Applicant: TDK Corporation, Tokyo (JP)

(72) Inventors: Koji Shimazawa, Tokyo (JP); Yoshihiro Tsuchiya, Tokyo (JP); Shuji Okame, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 15/152,701

(22) Filed: May 12, 2016

(51) Int. Cl.
| G11B 5/33 | (2006.01) |
| G11B 11/00 | (2006.01) |
| G11B 5/31 | (2006.01) |
| G11B 5/48 | (2006.01) |
| G11B 5/60 | (2006.01) |
| G11B 5/00 | (2006.01) |

(52) U.S. Cl.
CPC ............ *G11B 5/314* (2013.01); *G11B 5/3163* (2013.01); *G11B 5/4833* (2013.01); *G11B 5/6005* (2013.01); *G11B 2005/0021* (2013.01)

(58) Field of Classification Search
CPC .... G11B 2005/0021; G11B 2005/0005; G11B 5/314; G11B 5/3903; G11B 5/4907; G11B 5/2452; G11B 11/1058; G11B 11/10534; G11B 11/0595; B82Y 25/00; B82Y 10/00
USPC ............ 360/59, 313, 328; 369/13.17, 13.24, 369/13.33
See application file for complete search history.

(56) References Cited

U.S. PATENT DOCUMENTS 8,865,326 B2 * 10/2014 Fukumoto .............. B82Y 25/00
  365/171
2014/0043948 A1    2/2014 Hirata et al.

FOREIGN PATENT DOCUMENTS

JP         2014-010882 A    1/2014

OTHER PUBLICATIONS

J. Koike et al., "Effects of crystallographic texture on stress-migration resistance in copper thin films" Applied Physics Letters, vol. 8, No. 6, Aug. 5, 2002, pp. 1017-1019. Published by American Institution of Physics.

* cited by examiner

*Primary Examiner* — Nabil Hindi
(74) *Attorney, Agent, or Firm* — Posz Law Group, PLC

(57) ABSTRACT

A plasmon generator generates a surface plasmon, and generates a near-field light from the surface plasmon on a front end surface positioned on an air bearing surface opposing to a magnetic recording medium. The plasmon generator has a first surface that is adjacent to the front end surface and that faces a lower layer where the plasmon generator is deposited, and a second surface at the back side of the first surface relative to a down track direction. The first surface tilts toward a surface that is orthogonal to the down track direction, and, is parallel to across track direction, and the plasmon generator is deposited with a (111) orientation from the first surface toward the second surface.

15 Claims, 10 Drawing Sheets

PLASMON GENERATOR WITH (111) ORIENTED TIP PORTION FOR THERMAL ASSISTED MAGNETIC RECORDING HEAD

BACKGROUND OF THE INVENTION

1. Field of the Invention

The present invention relates to a plasmon generator for a thermal assisted magnetic recording head and a magnetic recording element that is equipped with the plasmon generator, and particularly relates to a configuration of the plasmon generator.

2. Description of the Related Art

Recently, in a magnetic recording apparatus typified by a magnetic disk apparatus, there has been a need for performance improvement of a thin film magnetic head and a magnetic recording medium in association with high recording density. As the thin film magnetic head, a composite type thin film magnetic head is widely used in which a reproducing head having a magnetoresistive effect element (MR element) for reading, and a recording head having an induction-type electromagnetic transducer element for writing, are laminated on a substrate.

The magnetic recording medium is a discontinuous medium in which magnetic grains are aggregated, where each magnetic grain has a single magnetic domain structure. Each recording bit on the magnetic recording medium is configured with a plurality of magnetic grains. In order to enhance the recording density, the unevenness of a boundary between recording bits that are adjacent to each other has to be smaller, and the magnetic grains have to be reduced in size for this purpose. However, small magnetic grains, i.e., magnetic grains with small volumes, cause a reduction in thermal stability of magnetization. In order to solve this problem, it is effective to increase anisotropy energy of the magnetic grains. However, high anisotropy energy of magnetic grains enhances a coercive force of the magnetic recording medium, and makes it difficult to record information with an existing magnetic head.

As a method for solving this problem, a so-called thermal assisted magnetic recording is proposed. In this method, a magnetic recording medium with greater coercive force can be used. When information is recorded, a magnetic field and heat are simultaneously added to a portion in the magnetic recording medium where information is recorded, and temperature of the portion is increased. With this process, information is recorded to the portion where the coercive force has been decreased by the magnetic field. Hereafter, a magnetic head that is used in the thermal assisted magnetic recording is referred to as a thermal assisted magnetic recording head (TAMR head).

A conventional TAMR head includes a core that propagates light irradiated from a laser diode and a plasmon generator that generates near-field light (NF light). The plasmon generator is coupled with a portion of propagation light that propagates in the core in a surface plasmon mode and generates a surface plasmon, allows the surface plasmon to propagate up to a front end surface positioned on an air bearing surface, and generates the NF light on the front end surface.

In the conventional TAMR head, deterioration of recording properties (such as an S/N ratio) in association with continuous recording occurs. Agglomeration of the front end surface of the plasmon generator is recognized as a main factor. Agglomeration is a phenomenon where metal atoms are gathered, and occurs as a result of dispersion or movement of the metal atoms using heat and stress as a driving force. Asperities exist on the air bearing surface of a magnetic head slider and a surface of the magnetic recording medium, and the front end surface of the plasmon generator may contact the magnetic recording medium while the magnetic recording apparatus is in operation. Temperature increase and stress increase due to the impact that occurs at this time cause agglomeration. The agglomeration easily causes the front end surface of the plasmon generator to recess from the air bearing surface. As a result, the distance between the plasmon generator and the magnetic recording medium is increased, and the capability to heat the magnetic recording medium is decreased over time, which causes deterioration of the S/N ratio. Therefore, it is desired to suppress agglomeration of the plasmon generators to ensure the reliability of the TAMR head.

US 2014-0043948 discloses a plasmon generator that consists primarily of Au, and where Co and Fe are added in a ratio of 0.2 at % to 2.0 at %. Agglomeration is suppressed by adding Co and Fe. However, an Au alloy where Co and Fe have been added exhibits poor propagation efficiency of the surface plasmon. Consequently, heat generation occurs due to the propagation loss of the surface plasmon on the surface plasmon propagation region of the plasmon generator. As a result, reliability of the plasmon generator is reduced. In other words, the reliability for agglomeration and recess of the plasmon generator at the tip portion is improved, but the above effect is reduced because of the impact of the heat generation due to the propagation loss of the surface plasmon.

The objective of the present invention is to provide a plasmon generator that has high thermal reliability, and where the recess on the front end surface is minimal, with a magnetic recording element using the plasmon generator.

SUMMARY OF THE INVENTION

One mode of the present invention relates to a plasmon generator that generates a surface plasmon, and that generates near-field light (NF light) from the surface plasmon on the front end surface positioned on an air bearing surface (ABS) opposing a magnetic recording medium. The plasmon generator is positioned in the vicinity of the front end surface, and has a first surface facing a lower layer where the plasmon generator is deposited, and a second surface positioned at a back side relative to the first surface relative to a down track direction. The first surface tilts toward a surface that is orthogonal to the down track direction, and is parallel to the cross track direction. A film is deposited in the portion between the first surface and the second surface of the plasmon generator with a (111) orientation from the first surface toward the second surface.

The plasmon generator is deposited with a (111) orientation from the first surface toward the second surface. The first surface tilts toward a surface that is orthogonal to a down track direction, and is parallel to a cross track direction. Consequently, the plasmon generator is deposit with a (111) orientation along the tilted first surface. As a result, the plasmon generator has similar crystal structure to a film deposited on the second surface apparently with a (100) orientation. The (100) plane has rigidity in the in-plane direction that is higher than the (111) plane, making the occurrence of deformation difficult in the direction orthogonal to the air bearing surface (ABS). Therefore, it is difficult for the recess in the direction that is orthogonal to the ABS to occur on the front end surface of the plasmon generator. Further, in the present invention, since the agglomeration and the recess of the plasmon generator on the front end surface is suppressed by controlling the plasmon generator crystal structure, it is unnecessary to add elements to the plasmon generator to prevent agglomeration. Therefore, the thermal reliability of the plasmon generator is also improved.

Another mode of the present invention relates to a magnetic recording element. The magnetic recording element has a plasmon generator that generates surface plasmon, and that generates near-field light (NF light) from the surface plasmon on the end front surface positioned on the ABS opposing a magnetic recording medium; a lower layer on which the plasmon generator is deposited; and a main pole having a front end surface of the ABS is positioned in the vicinity of the front end surface of the plasmon generator, and that is positioned at an opposite side of the lower surface relative to the plasmon generator in a down track direction, and that emits a magnetic flux to the magnetic recording medium. The plasmon generator has a first surface that is positioned in the vicinity of the front end surface and faces the lower layer, and a second surface positioned at a back side of the first surface relative to a down track direction. The first surface tilts toward a surface that is orthogonal to a down track direction, and, is parallel with a cross track direction. A film is deposited in the portion between the first surface and the second surface of the plasmon generator with a (111) orientation toward the second surface from the first surface.

Further another mode of the present invention relates to a method for manufacturing a magnetic recording element. This manufacturing method includes deposition of a plasmon generator that generates a surface plasmon and that generates NF light form the surface plasmon on the front end surface positioned on the ABS opposing a magnetic recording medium at the upper side of the lower layer; and formation of a main pole where its front end surface is positioned in the vicinity of the ABS on the front end surface of the plasmon generator, and that is positioned at an opposite side of the lower layer relative to the plasmon generator in a down track direction, and that emits a magnetic flux on the magnetic recording medium. The plasmon generator has a first surface that is positioned in the vicinity of the front end surface and faces the lower layer, and a second surface that is positioned at a back side of the first surface relative to a down track direction. The first surface tilts toward the surface that is orthogonal to a down track direction, and, is parallel to a cross track direction. A portion between the first surface and the second surface of the plasmon generator is deposited with a (111) orientation from the first surface toward the second surface.

Further to the objective above, other objectives, characteristics and advantages of the present invention will be clarified from the explanation below with reference to attached drawings where the present invention is exemplified.

DETAILED DESCRIPTION OF THE INVENTION

Figure 1:
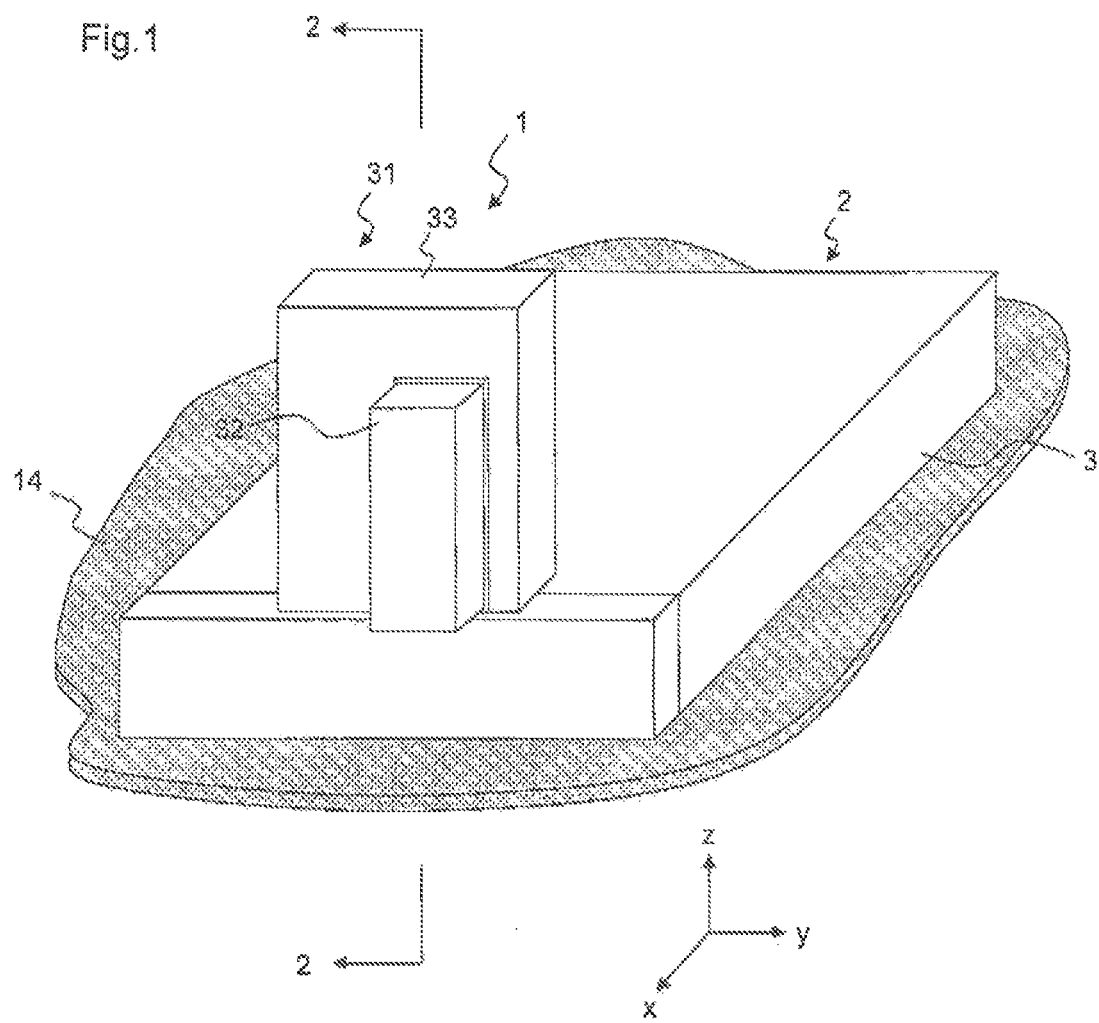
FIG. 1 is an overall perspective view of a thermal assisted magnetic recording head.
Figure 2:
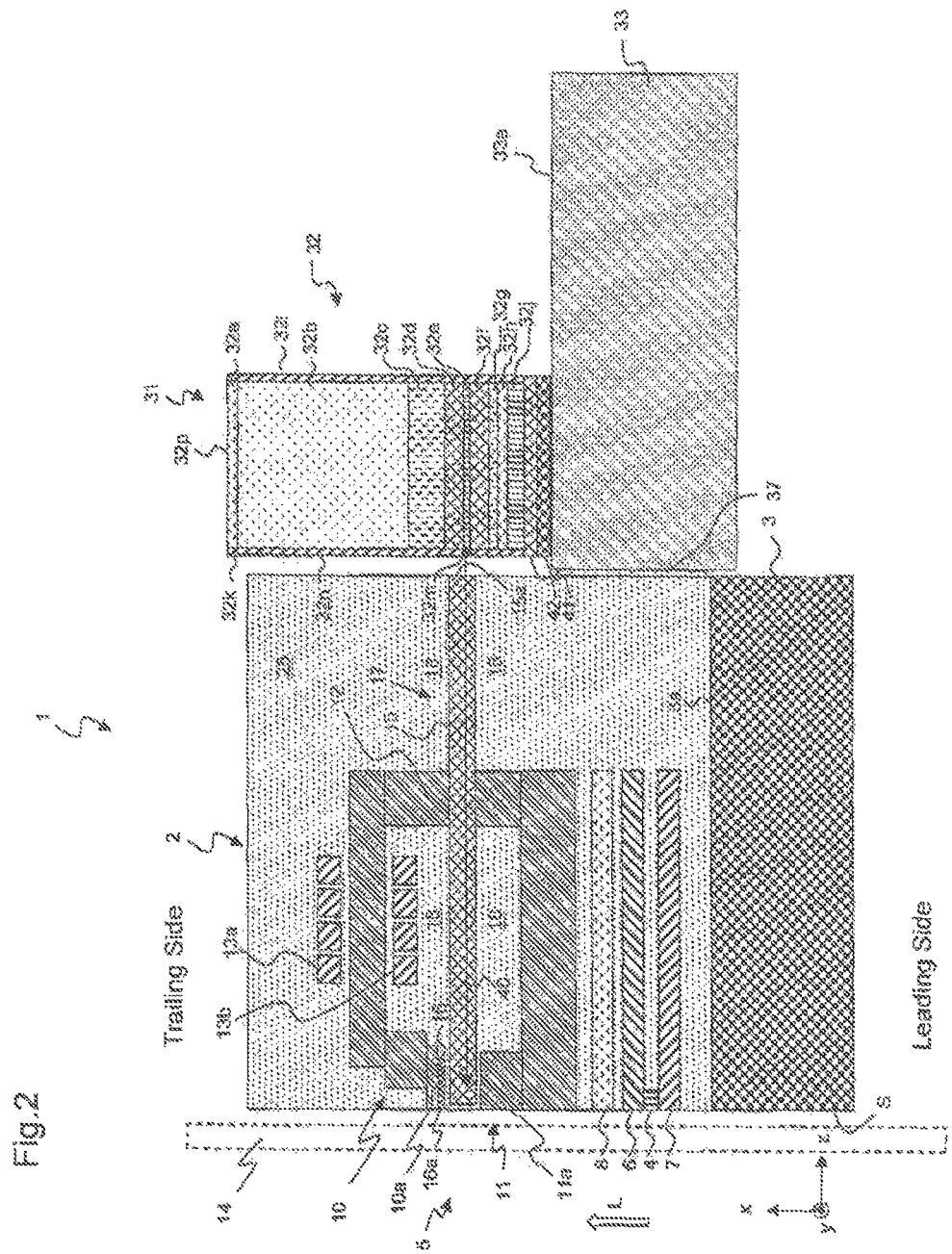
FIG. 2 is a conceptual cross-sectional view of a thermal assisted magnetic recording head relating to one embodiment of the present invention.

First, a configuration of a thermal assisted magnetic recording head relating to one embodiment of the present invention is explained. FIG. 1 is an overall diagram of the thermal assisted magnetic recording head. FIG. 2 is an overall perspective view of the thermal assisted magnetic recording head along sectional Line 2-2 in FIG. 1.

In the present specification, the x-direction means a down track direction or a direction that is orthogonal to a principle plane 3a of a substrate 3 where a magneto resistive (MR) element, a magnetic recording element and the like are formed, and corresponds to a circumferential direction of the magnetic recording medium. The y-direction means a cross track direction of a magnetic recording medium 14, and corresponds to a radial direction of the magnetic recording medium. The z-direction means a direction that is orthogonal to an air bearing surface S of a magnetic head slider. The x-direction matches a deposit direction L in a wafer process. The x-direction, the y-direction and the z-direction are orthogonal to each other. "Upward" and "downward" mean a direction that is away from the substrate 3 and a direction closer to the substrate 3 relative to the x-direction, respectively. "Trailing side" and "leading side" may be used instead of "upward" and "downward," respectively. The "surface that is orthogonal to the down track direction" means a y-z plane, i.e., a surface that is parallel to the principle plane 3a of the substrate 3.

A magnetic head 1 has a magnetic head slider 2, and a laser diode unit 31 that is pinned to the magnetic head slider 2 and that emits a laser light.

The magnetic head slider 2 has a substantially-hexahedral shape, and one plane out of those constitutes the air bearing surface S opposing the magnetic recording medium 14. The magnetic head slider 2 has an MR element 4, a magnetic recording element 5, a waveguide 17 that is equipped with a core 15 where the laser light emitted from the laser diode unit 31 can propagate as propagating light, and a plasmon generator 16 that generates near-field light (NF light) on the air bearing surface S from the propagating light. These elements are formed on the substrate 3 made from AlTiC (Al2O3-TiC).

The magnetic recording element 5 has a main pole 10 for perpendicular magnetic recording facing the air bearing surface S. The main pole 10 is placed adjacent to the plasmon generator 16. A portion of the main pole 10 projects toward the leading side and contacts the plasmon generator 16. Due to this design, heat generation from the plasmon generator 16 is dissipated to the main pole 10. A main pole end surface 10a, which is an end portion of the main pole 10, is positioned on the air bearing surface S, and on the air bearing surface S generates a magnetic field for recording. A leading shield 11 is placed at the leading side of the main pole 10 in the down track direction x. The leading shield 11 is magnetically linked with the main pole 10 via a contact part 12, and constitutes an integral magnetic circuit with the main pole 10. The leading shield 11 has a shield end surface 11a facing the air bearing surface S. Coils 13a and 13b are wound around the main pole 10 centering on the contact part 12. The main pole 10, the leading shield 11 and the contact part 12 are formed with an alloy made from any two or three of Ni, Fe and Co. An overcoat layer 25 made from $Al_2O_3$ is placed at the upper side of the magnetic recording element 5 in the x-direction.

The magnetic flux generated within the main pole 10 is emitted as a magnetic flux for writing from the main pole end surface 10a toward the magnetic recording medium 14. The magnetic flux emitted from the main pole end surface 10a enters into the magnetic recording medium 14 and magnetizes each recording bit in the perpendicular direction z. The magnetic flux changes its magnetic path to the in-plane direction (x-direction), and further changes its orientation to the perpendicular direction (z-direction) again in the vicinity of the leading shield 11, and is absorbed to the leading shield 11 from the shield end surface 11a.

The magnetic head slider 2 has a waveguide 17 where laser light propagates. The waveguide 17 is positioned at the leading side in the down track direction x closer than the plasmon generator 16. The waveguide 17 has the core 15 and a clad 18 covering the core 15. The core 15 propagates the laser light generated at the laser diode unit 31 in the z-direction as propagating light 40. The core 15 is extended from an end part 15a (incident end surface of laser light) opposing the laser diode unit 31 of the magnetic head slider 2 to the vicinity of the air bearing surface S. A cross section of the core 15 that is orthogonal to the propagation direction (z direction) of the propagating light 40 is rectangular, and its width (length in the y-direction) is greater than thickness (length in the x-direction). The core 15 can be formed, for example, with TaOx. TaOx means a tantalum oxide with optional composition, and $Ta_2O_5$, TaO, $TaO_2$ and the like are typical, but TaOx is not limited to these. The core 15 is covered with the clad 18 with a smaller refractive index than the core 15. The clad 18 can be formed with a dielectric body, such as $SiO_2$ or $Al_2O_3$.

The magnetic head slider 2 has the MR element 4 where its front end surface is positioned on the air bearing surface S, and an upper-side shield layer 6 and a lower-side shield layer 7 that are placed at both sides of the MR element 4 in the x-direction, respectively. The MR element 4 is a reproducing element that reads information recorded in the magnetic recording medium, and can be any of a Current In Plane (CIP)-Gigantic Magneto Resistive (GMR) element where a sense current flows in the y-direction, a Current Perpendicular to Plane (CPP)-GMR element where a sense current flows in the x-direction, and a Tunneling Magneto Resistive (TMR) element where a sense current flows in the x-direction and utilizes a tunnel effect. If the MR element 4 is a CPP-GMR element or a TMR element, the upper-side shield layer 6 and the lower-side shield layer 7 are also utilized as electrodes that supply a sense current. A magnetic shield layer 8 is disposed between the MR element 4 and the magnetic recording element 5.

Figure 3A:
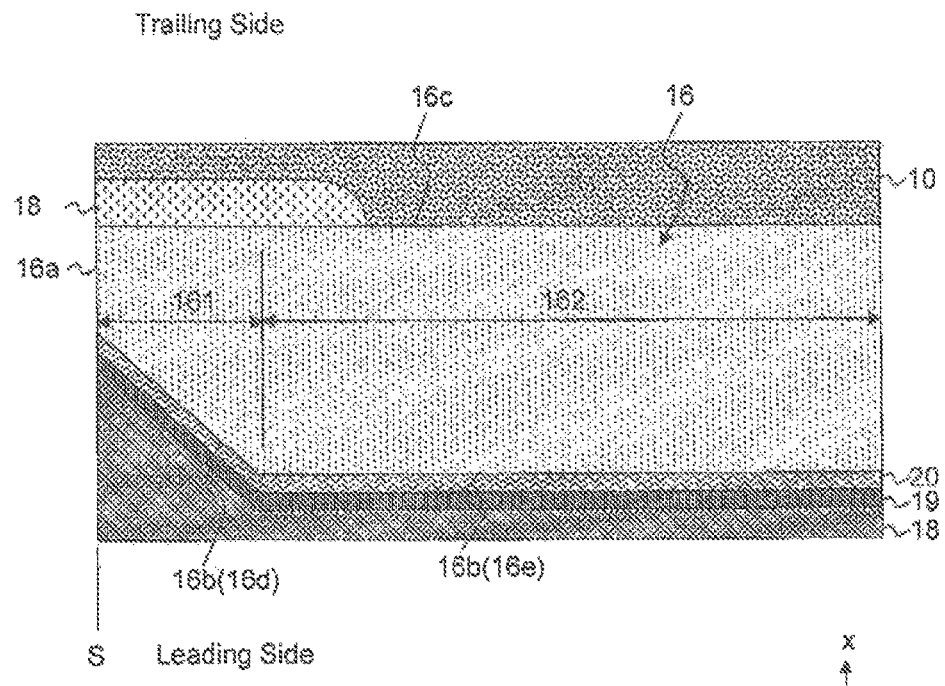
FIG. 3A is a conceptual cross-sectional view of a plasmon generator.
Figure 3B:
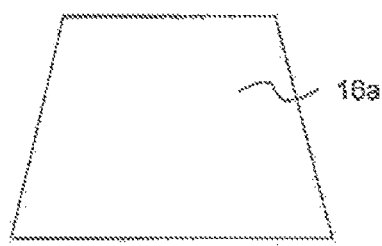
FIG. 3B is a front view on an air bearing surface of the plasmon generator shown in FIG. 3A.
Figure 3C:
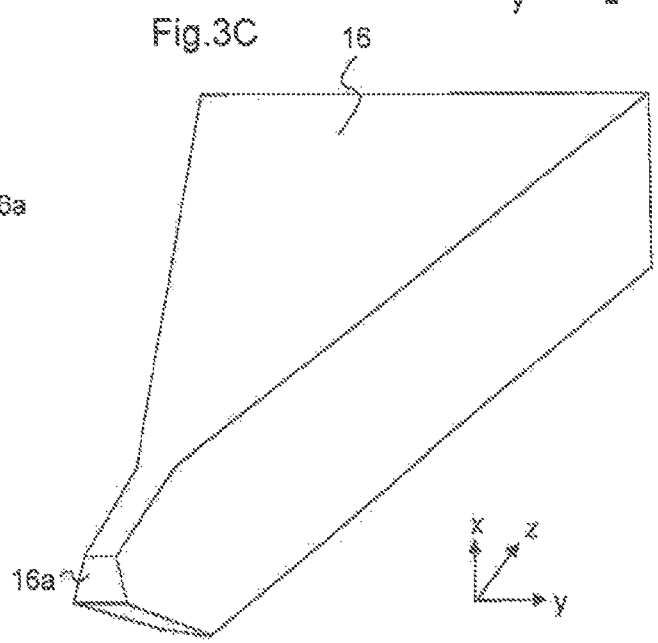
FIG. 3C is a perspective view of the plasmon generator shown in FIG. 3A.

The magnetic head slider 2 has the plasmon generator 16 that generates NF light on the air bearing surface S from the propagating light 40. As shown in FIG. 3, the plasmon generator 16 is a pillar-state metal piece extending in the height direction z. The plasmon generator 16 can be formed with metal consisting primarily of Au or AuCu. The primary component means that an atomic fraction of Au, the atomic fraction of AuCu or a sum of the atomic fraction of Au and that of AuCu is 90% or greater.

The plasmon generator 16 has a tip portion 161 where its length in the down track direction x is gradually increased toward the height direction z, and a central part 162 where its length in the down track direction x is constant in the height direction z. The length of the central part 162 in the cross track direction y is gradually increased toward the height direction z.

The plasmon generator 16 is equipped with the front end surface 16a facing the air bearing surface S. The front end surface 16a is a surface of trapezoidal geometry where its leading side is a long side and its trailing side is a short side, but it may be another shape, such as a rectangle, square or triangle. A main pole end surface 10a of the main pole is positioned in the vicinity of the front end surface 16a.

Out of the surfaces of the plasmon generator 16 extending in the height direction z, a surface 16c at the trailing side extends in parallel with the height direction z. The surface at the leading side constitutes a propagating surface 16b which opposes core 15. The propagating surface 16b is bent halfway in the direction z that is orthogonal to the air bearing surface S. In other words, the propagating surface 16b has a surface 16d belonging to the tip portion 161, a surface 16e that is included in the central part 162 and that is connected to the surface 16d, and that extends in parallel with the y-z plane. In the explanation below, the surface 16 (may be referred to as a first surface 16d. Further, the surface 16c at the trailing side may be referred to as the second surface 16c.

The propagating surface 16b is coupled with the propagating light 40, which propagates on the core 15, in a plasmon mode, and generates a surface plasmon. The surface plasmon propagates on the propagating surface 16b up to the front end surface 16a, and generates NF light on the front end surface 16a With this design, the plasmon generator 16 heats a portion where information is recorded of the magnetic recording medium 14.

The first surface 16d of the plasmon generator 16 is adjacent to the front end surface 16a of the plasmon generator 16, or is positioned in the vicinity of the front end surface 16a. The first surface 16d faces the substrate 3 side, and is equivalent to the lower surface of the plasmon generator 16 in the wafer process. In other words, the first surface 16d faces a "lower layer" positioned below the plasmon generator 16, and the plasmon generator 16 is laminated on the lower layer. The "lower layer" is a NiO film 19 if the NiO film 19 to be described later is included, and is a dielectric body layer, such as $SiO_2$ or $Al_2O_3$, constituting the clad 18 if the NiO film 19 is omitted. In the present embodiment, the lower layer is the NiO film 19. Although illustration is omitted, the plasmon generator 16 may have a surface extending in parallel with the y-z plane between the end portion of the first surface 16d at the air bearing surface S side and the air bearing surface S. The first surface 16d tilts toward the surface (y-z plane) that is orthogonal to the down track direction x and is parallel to the cross track direction y. The first surface 16d tilts toward the y-z plane with an orientation that increases the space between the first surface 16d and the second surface 16c in the down track direction x that increasingly separates from the air bearing surface S.

The second surface 16c of the plasmon generator 16 is positioned at the back side of the first surface 16d relative to the down track direction x, and is equivalent to the upper surface of the plasmon generator in the wafer process. The second surface 16c is parallel to the surface (y-z plane) that is orthogonal to the down track direction x.

The NiO film 19 and an adhesiveness improvement layer 20 are disposed on the dielectric body layer, such as $SiO_2$ or $Al_2Oz$, constituting the clad 18. The adhesiveness improvement layer 20 is made of iridium oxide IrOx with optional composition or ruthenium oxide RuOx with optional composition. The adhesiveness improvement layer 20 improves adhesiveness between the NiO film 19 and the plasmon generator 16. As described below, it is preferable that the NiO film 19 has 50 nm or greater of film thickness. It is preferable that the adhesiveness improvement layer 20 has 0.5 to 2.0 nm of film thickness.

Figure 4A:
FIGS. 4A to 4D are pattern diagrams showing a manufacturing process of the plasmon generator.
Figure 4B:
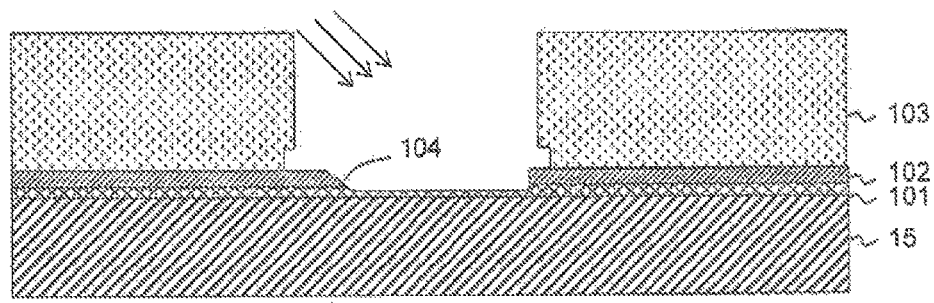
Figure 4C:
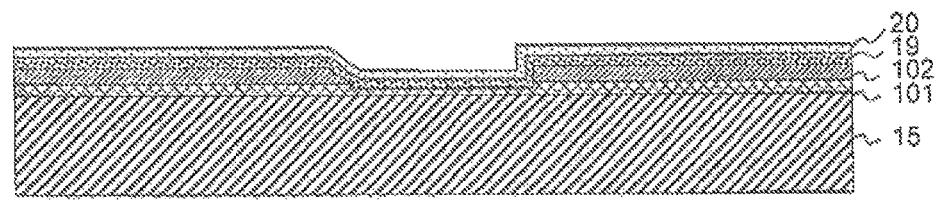
Figure 4D:
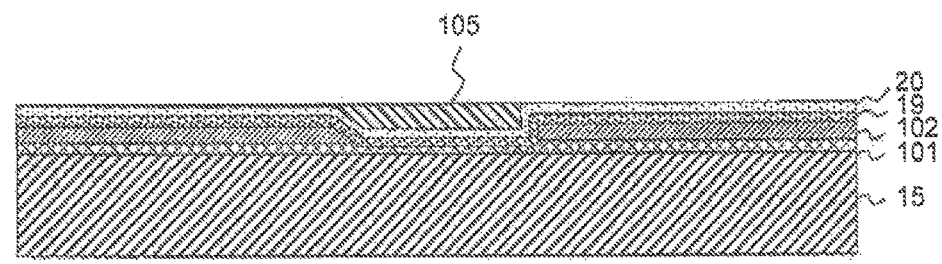

A method for manufacturing the plasmon generator 16 is explained with reference to FIGS. 4A to 4D. First, as shown in FIG. 4A, an $Al_2O_3$ film 101 constituting the clad 18 and a $SiO_2$ film 102 are deposited on the core 15. Next, as shown in FIG. 4B, a resist 103 is formed, and a portion of the $Al_2O_3$ film 101 and the $SiO_2$ film 102 are removed by ion milling. On this occasion, a slope 104 is formed in the $Al_2O_3$ film 101 and the $SiO_2$ film 102 by irradiating an ion beam from an oblique direction. Next, as shown in FIG. 4C, the resist 103 is removed, and the NiO film 19 and adhesiveness improvement layer 20 are formed. Then, as shown in FIG. 4D, an Au film 105 constituting the plasmon generator 16 is deposited by sputtering. Furthermore, the magnetic head slider 2, according to the configuration shown in FIG. 2, can be prepared by forming the lower-side shield layer 7, the MR element 4, the upper-side shield layer 6 and a magnetic shield layer 8 on the substrate 3, and by sequentially forming the leading shield 11, the waveguide 17, the plasmon generator 16 and the main pole 10.

Figure 5A:
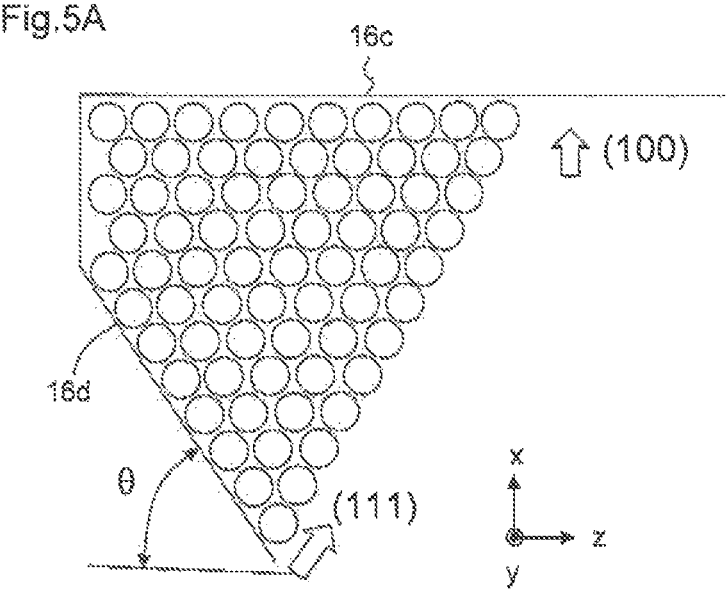
FIGS. 5A to 5C are pattern diagrams showing orientation of a front end surface of the plasmon generator.

In the process shown in FIG. 4D, a portion between the first surface 16d and the second surface 16c of the plasmon generator 16 is deposited on the NiO film 19 and the adhesiveness improvement layer 20 with a (111) orientation from the first surface 16d toward the second surface 16c. FIG. 5A shows a pattern diagram. This is because Au and AuCu have a characteristic to be preferentially oriented on the (111) plane if deposition by a sputtering method is used. The "Portion between the first surface 16d and the second surface 16c" may include at least the tip portion 161, and may include a portion of the central part 162 adjacent to the tip portion 161.

Figure 5B:
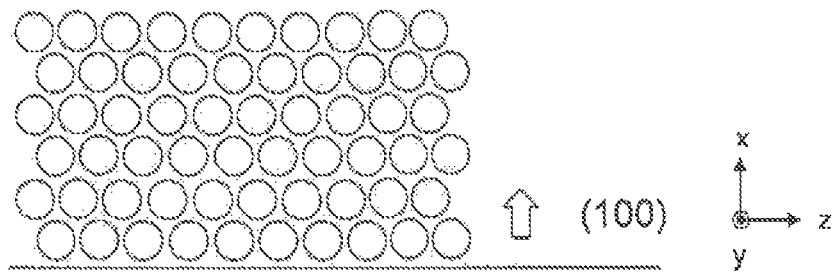
Figure 5C:
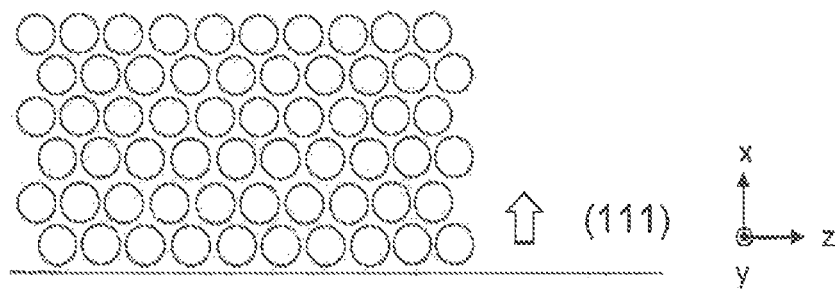
Figure 6:
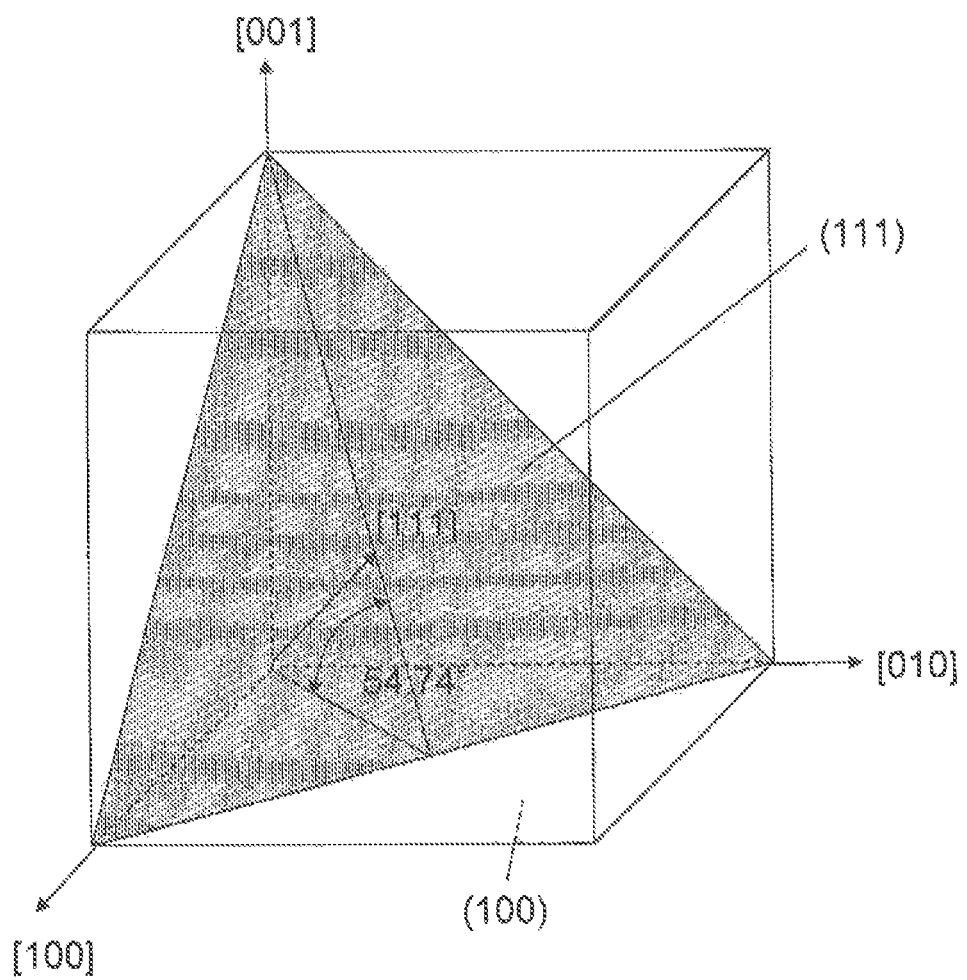
FIG. 6 is an explanatory diagram of the (111) plane.

Since the NiO film 19, which is a seed layer, tilts toward the y-z plane, the plasmon generator 16 is deposited with the (111) orientation plane relative to the tilted seed layer. As shown in FIG. 6, the (111) plane tilts by 54.64 degrees relative to the (100) plane. Therefore, if the seed layer tilts by 54.64 degrees relative to the y-z plane, an alignment of metal atoms, which is the same as that deposited by orientating the (100) plane, can be obtained on the y-z plane. In other words, as shown in FIG. 5B, the same result as deposition of Au or AuCu on the seed layer, which is parallel to the y-z plane, with the (100) orientation plane can be obtained. Au or AuCu is deposited on the seed layer, which is parallel to the y-z plane, with the (111) orientation plane within a plane, which is parallel to the y-z plane, as shown in FIG. 5C. The (111) plane with Au or AuCu has low rigidity in the in-plane direction, and is easily deformed in the in-plane direction. Consequently, if Au or AuCu is with the (111) orientation plane, it is disadvantageous to recess the plasmon generator 16 in the z-direction. In the meantime, since rigidity on the (100) plane with Au or AuCu in the in-plane direction is great and it is difficult to be deformed in the in-plane direction, it is difficult to cause the recess of the plasmon generator 16 in the z-direction. A direction where the recess of the plasmon generator 16 becomes an issue is the direction z that is orthogonal to the air bearing surface S. Therefore, the plasmon generator 16 where it is difficult to cause the recess in the direction z that is orthogonal to the air bearing surface S can be obtained by forming the first surface 16d so as to tilt ideally at 54.64 degrees, or within the range of 40 degrees to 70 degrees θ by taking manufacturing error into consideration, relative to the y-z plane, and by depositing the Au or the AuCu film onto the first surface 16d so as to be oriented with the (111) orientation plane.

It becomes easy to orient the plasmon generator 16 toward the (111) plane by placing the NiO film 19. This is because a lattice mismatch between NiO and Au or between NiO and AuCu is small. The lattice mismatch is defined by $|I_1-I_2|/I_1$ when a lattice constant of the seed layer is $I_i$ and that of a deposition film on the seed layer is $I_2$. It is desirable that the lattice mismatch is 5% or less. NiO has a very small lattice mismatch with Au or AuCu at 2.7%, and it tends to be oriented toward the (111) plane. Consequently, the Au film or the AuCu film on the NiO film tends to be easily oriented toward the (111) plane.

Figure 7A:
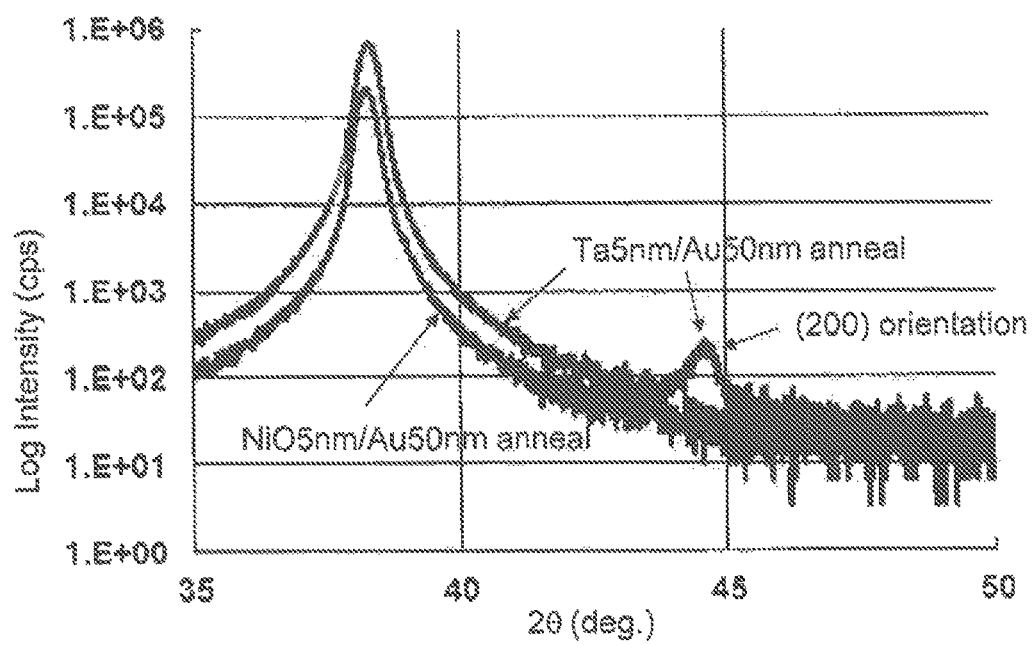
FIG. 7A shows an XRD pattern of an Au deposit on a NiO film.

FIG. 7A shows an X-ray diffraction pattern (XRD pattern) of the Au deposit on the NiO film Specifically, after an Au film with 50 nm of film thickness was deposited on an NiO film with 5 nm of film thickness and was annealed, the XRD pattern was observed with an X-ray analysis method. As a comparative example, after the Au film with 50 nm of film thickness was deposited on a Ta film with 50 nm of film thickness and was annealed, the XRD pattern was observed with an X-ray analysis method. The horizontal axis indicates 2θ of diffraction angle, and the vertical axis indicates X-ray intensity. In the comparative example, a diffraction line indicating the orientation of the (200) plane of the Au film was observed, and its orientation is poor. In the example, the (200) plane orientation was not observed, but only the (111) plane orientation is observed.

Figure 7B:
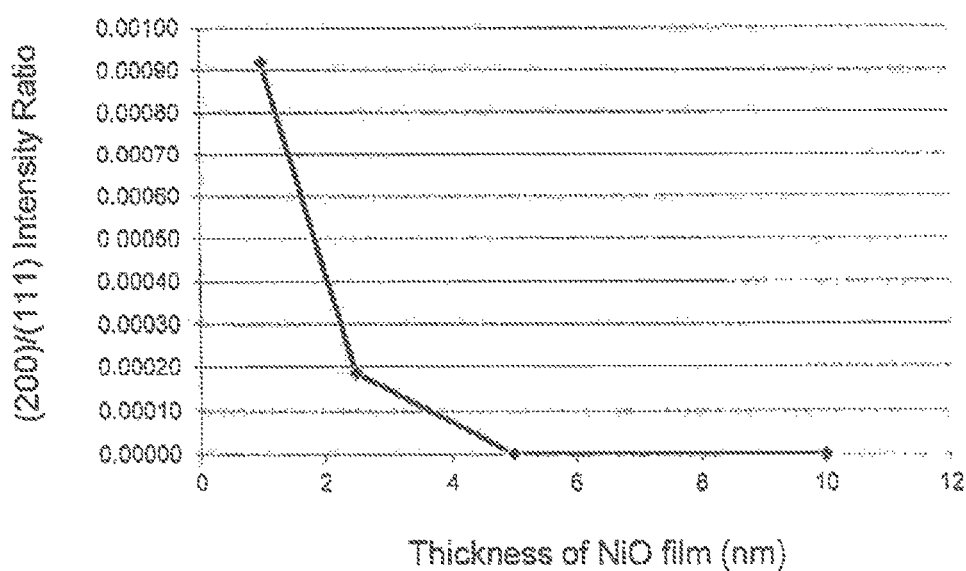
FIG. 7B shows a relationship between film thickness of the NiO film and X-ray intensity.

FIG. 7B shows a relationship between the film thickness of the NiO film and the orientation. The horizontal axis indicates the film thickness of the NiO film, and the vertical axis indicates a ratio of orientation intensity of the (200) plane to that of the (111) plane. When the Ta film shown in FIG. 7A was used as a seed layer, the ratio above was 0.0003. When the NiO film with 1 nm of film thickness is used as a seed layer, the (200) plane orientation exists, and an effect to improve the orientation of the Au film is small. When the NiO film with 2.5 nm of film thickness is used as a seed layer, although the (200) plane orientation exists, the orientation of the Au film is improved compared to the case of using the Ta film as a seed layer. When the NiO film with 5 nm or 10 nm of film thickness is used as a seed layer, the orientation intensity of the (200) plane becomes zero. Therefore, it is desirable that the film thickness of the NiO film is 2.5 nm or greater, and it is further desirable that it is 5 nm or greater.

Figure 8A:
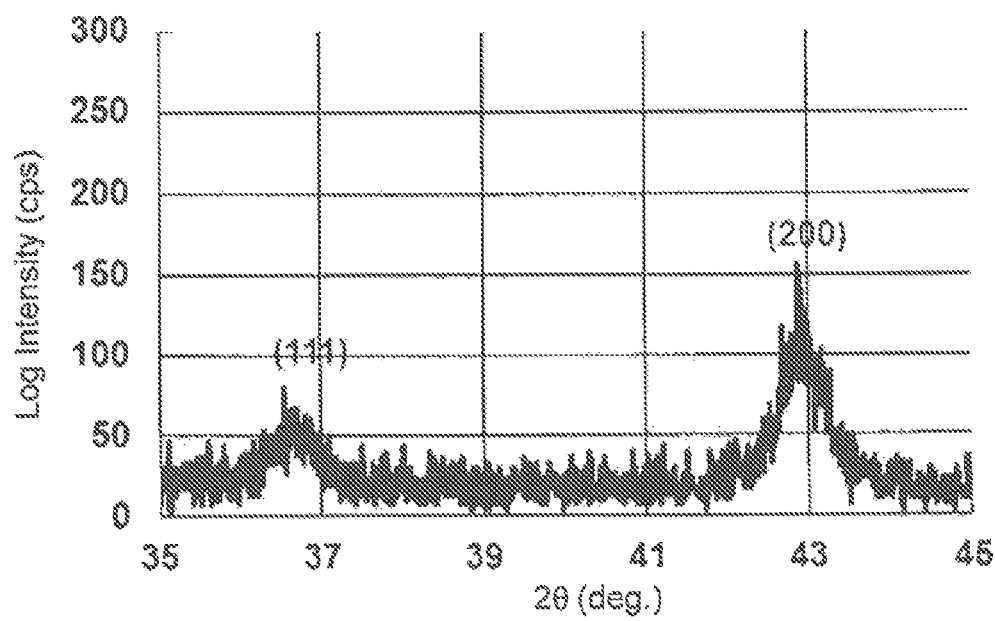
FIG. 8A shows the XRD pattern of the Au deposited on the NiO film manufactured with an exemplary manufacturing process.
Figure 8B:
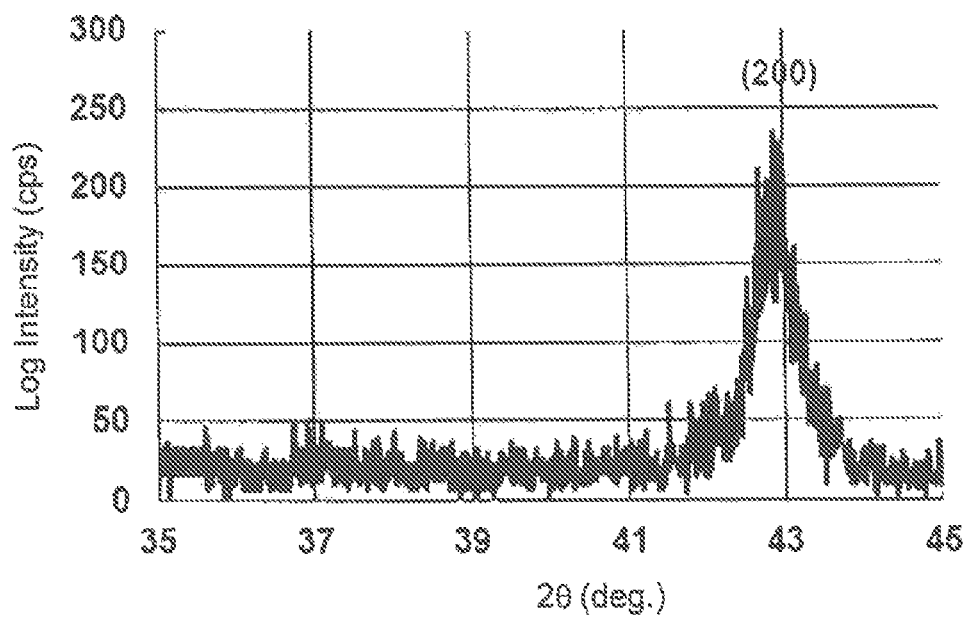
FIG. 8B shows the XRD pattern of the Au deposited on the NiO film manufactured with a comparative exemplary manufacturing process.

When the NiO film is deposited, it is desirable that Ni is deposited by sputtering first, and oxidation treatment is then conducted. It is desirable that the oxidation treatment is conducted by exposing the Ni film to oxygen plasma or oxygen radical. FIG. 8A shows the XRD pattern of the NiO film produced as mentioned above. FIG. 8B shows the XRD pattern of the NiO film produced by placing a Ni target in the atmosphere of mixed gas with oxygen and noble gas using sputtering. The (200) orientation is excellent, and an Au film or an AuCu film with the (111) orientation cannot be efficiently formed on the NiO film. However, in FIG. 8A, since the (111) oriented NiO film is obtained, an Au film or an AuCu deposit on the NiO film tends to be deposited with the (111) orientation.

Referring to FIG. 2 again, a laser diode unit 31 is positioned opposing a surface at the opposite side of the air bearing surface S of the magnetic head slider 2. The laser diode unit 31 emits a laser light in the direction z that is perpendicular to the air bearing surface S toward the core 15 of the waveguide 17 in the magnetic head slider 2. The laser diode unit 31 is soldered to the magnetic head slider 2 by adhesion layer 37.

The laser diode unit 31 is equipped with a laser diode 32, which is a laser light generating element, and a sub-mount 33 where this is mounted. The laser diode 32 supplies laser light to the core 15. The sub-mount 33 is made from a Si substrate or the like. The laser diode 32 is mounted on a mounting surface 33a of the sub-mount 33. Specifically, a first electrode (p electrode) 32j of the laser diode 32 is pinned to a pad 41 placed on the mounting surface 33a of the sub-mount 33 with a solder material 42.

The laser diode 32 is an edge surface emitting type, and is preferably one that is normally used for communication, such as an InP-series, GaAs-series or GaN-series, for optical-series disk storage or for material analysis. A wavelength of laser light to be radiated is not particularly limited, but a wavelength within the range of 375 nm to 1.7 μm is usable, and a wavelength particularly with approximately 650 to 900 nm is preferably used.

The laser diode 32 is not limited to the configuration below, but in one example, it has a configuration where an n electrode 32a constituting the second electrode, an n-GaAs substrate 32b, an n-InGaAlP clad layer 32c, a first InGaAlP guide layer 32d, an active layer 32e made from a multiple-quantum well (InGaP/InGaAlP) or the like, a second InGaAlP guide layer 32f, a p-InGaAlP clad layer 32g, a p electrode seed layer 32h, and a p electrode 32j constituting the first electrode are sequentially laminated. Reflection layers 32k and 32l for exciting the oscillation by total reflection are formed in front and behind a cleavage surface of the laser diode 32. A surface of the reflection layer 32k. i.e., a surface of the laser diode 32 opposing the magnetic head slider 2 constitutes an emitting surface 32n of the laser diode 32. An emission center 32m exists at a position of the active layer 32e of the reflection layer 32k. The n electrode 32a and the p electrode 32j can be formed with Au or Au alloy with approximately 0.1 μm of thickness. When a hard disk device is operated, the laser diode 32 is fed from a power source within the hard disk device via the first electrode 32j and the second electrode 32a.

Next, a head gimbal assembly where the thermal assisted magnetic recording head is mounted is explained.

Figure 9:
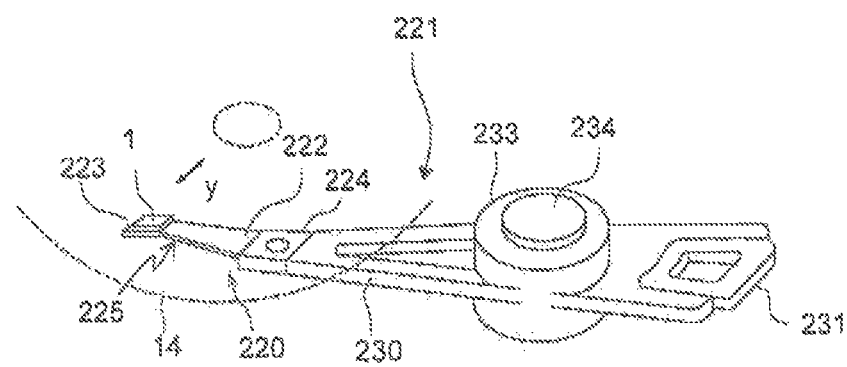
FIG. 9 is a perspective view of a head arm assembly of the present invention.

With reference to FIG. 9, a head gimbal assembly 220 is equipped with the magnetic head 1 and a suspension 225 that elastically supports the magnetic head 1. The suspension 225 has a plate spring-state load beam 222 formed with stainless steel, a flexure 223 disposed at one end portion of the load beam 222 and a base plate 224 disposed at the other end position of the load beam 222. The magnetic head 1 is joined to the flexure 223, and an adequate degree of freedom is granted to the magnetic head 1. A gimbal part for keeping the posture of the magnetic head 1 constant is disposed in a portion of the flexure 223 where the magnetic head 1 is mounted.

A member where the head gimbal assembly 220 is mounted to the arm 230 is referred to as a head arm assembly 221. The arm 230 moves the magnetic head 1 in the cross track direction y of the magnetic recording medium 14. One end of the arm 230 is mounted to the base plate 224. A coil 231 to be a part of a voice coil motor is mounted to the other end of the arm 230. A bearing part 233 is disposed in an intermediate portion of the arm 230. The arm 230 is supported to be rotatable by a shaft 234 mounted to the bearing part 233. The arm 230 and the voice coil motor that drive the arm 230 constitute an actuator.

Figure 10:
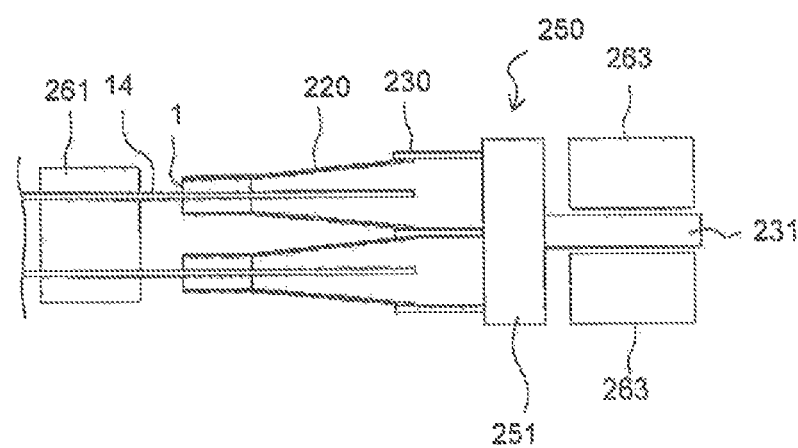
FIG. 10 is a side view of a head stack assembly of the present invention.
Figure 11:
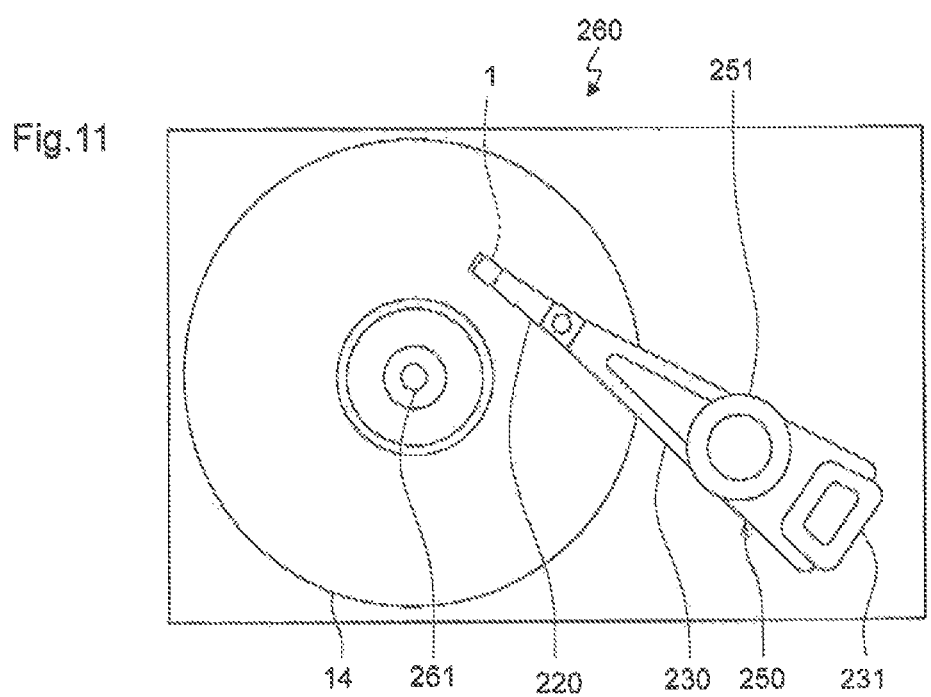
FIG. 11 is a plan view of a magnetic recording apparatus of the present invention.

Next, with reference to FIG. 10 and FIG. 11, a head stack assembly where the magnetic head 1 described above is incorporated, and a magnetic recording apparatus are explained. The head stack assembly is an assembly where the head gimbal assembly 220 is mounted to arms in a carriage having a plurality of arms, respectively. FIG. 10 is a side view of the head stack assembly, and FIG. 11 is a plan view of the magnetic recording apparatus. A head stack assembly 250 has a carriage 251 having a plurality of arms 230. The head gimbal assembly 220 is mounted in the arms 230 so as to align in a perpendicular direction by spacing from each other, respectively. The coil 231 to be a part of the voice coil motor is mounted at the opposite side of the arm 230 across the carriage 251. The voice coil motor has a permanent magnet 263 arranged at a position opposing the coil 231.

With reference to FIG. 11, the head stack assembly 250 is incorporated into a magnetic recording apparatus 260. The magnetic recording apparatus 260 has a plurality of magnetic recording media 14 mount in a spindle motor 261. Two magnetic heads 1 are arranged in the magnetic recording media 14 so as to be opposite across the magnetic recording medium 14, respectively. The head stack assembly 250 except for the magnetic head 1 and the actuator fall under a positioning device and support the magnetic heads 1, and, position the magnetic heads 1 relative to the magnetic recording media 14. The magnetic heads 1 are moved in the cross track direction y of the magnetic recording media 14 by the actuator, and are positioned relative to the magnetic recording media 14. The magnetic head 1 records information in the magnetic recording medium 14 by the magnetic recording element 5, and reproduces the information recorded in the magnetic recording medium 14 by the MR element 4.

The desirable embodiments of the present invention were presented and were explained in detail, but readers need to understand that the present invention is variously modifiable and correctable without departing from the concept and the scope of attached claims.

What is claimed is:

1. A plasmon generator that generates a surface plasmon, and that generates near-field light from the surface plasmon on a front end surface positioned on an air bearing surface opposing a magnetic recording medium, comprising:
   a first surface that is positioned in the vicinity of the front end surface and that faces a lower layer where the plasmon generator is deposited, and a second surface positioned at a back side of the first surface relative to a down track direction, wherein
   the first surface tilts toward a surface that is orthogonal to the down track direction, and is parallel to the cross track direction; and a portion between the first surface and the second surface of the plasmon generator is deposited with a (111) orientation from the first surface toward the second surface.

2. The plasmon generator according to claim 1, wherein the plasmon generator is formed primarily of gold, or an alloy of gold and copper.

3. The plasmon generator according to claim 1, wherein the first surface tilts at an angle between 40 to 70 degrees toward the surface that is orthogonal to the down track direction in an orientation where a space between the first surface and the second surface increasingly separates from the air bearing surface.

4. A magnetic recording element, comprising:
a plasmon generator that generates a surface plasmon, and that generates near-field light from the surface plasmon on a front end surface position on an air bearing surface opposing a magnetic recording medium,
a lower layer on which the plasmon generator is film-formed, and
a main pole having a front end surface that is positioned in the vicinity of the air bearing surface on the front end surface of the plasmon generator, and that is positioned at an opposite side of the lower layer relative to the plasmon generator in a down track direction, wherein
the plasmon generator has a first surface that is positioned in the vicinity of the front end surface, and a second surface that is positioned at a back side of the first surface relative to the down track direction;
the first surface tilts toward a surface that is orthogonal to the down track direction, and is in parallel to a cross track direction; and
a portion between the first surface and the second surface of the plasmon generator is deposited with a (111) orientation from the first surface toward the second surface.

5. The magnetic recording element according to claim 4, wherein
the plasmon generator is formed by of gold, or an alloy of gold and copper.

6. The magnetic recording element according to claim 4, wherein
the first surface tilts at an angle between 40 to 70 degrees toward a surface that is orthogonal to the down track direction with an orientation where a space between the first surface and the second surface increasingly separates from the air bearing surface.

7. The magnetic recording element according to claim 4, wherein
a lattice mismatch ratio between the lower layer and the plasmon generator is 5% or less.

8. The magnetic recording element according to claim 4, wherein
the lower layer is made from NiO.

9. The magnetic recording element according to claim 8, wherein
the film thickness of the lower layer is 2.5 nm or greater.

10. The magnetic recording element according to claim 8, wherein
the film thickness of the lower layer is 5 nm or greater.

11. The magnetic recording element according to claim 4, further comprising: a layer of iridium oxide or ruthenium oxide between the lower layer and the first surface of the plasmon generator.

12. A head gimbal assembly, comprising:
a magnetic head slider comprising the magnetic recording element according to claim 4, and a suspension that elastically supports the magnetic head slider, wherein
the suspension comprises
a flexure to which the magnetic head slider is joined,
a load beam having one end connected to the flexure, and
a base plate connected to an other end of the load beam.

13. A magnetic recording apparatus, comprising:
a magnetic head slider comprising the magnetic recording element according to claim 4,
the magnetic recording medium positioned to oppose the magnetic head slider,
a spindle motor that rotates and drives the magnetic recording medium, and
a device that supports and positions the magnetic head slider relative to the magnetic recording medium.

14. A method for manufacturing a magnetic recording element, comprising:
deposited a plasmon generator that generates a surface plasmon, and that generates near-field light from the surface plasmon on a front end surface positioned on an air bearing surface opposing a magnetic recording medium at an upper side of the lower layer, and forming a main pole having a front end surface positioned in the vicinity of the air bearing surface on the front end surface of the plasmon generator, and that is positioned at an opposite side of the lower layer relative to the plasmon generator in a down track direction, and that emits a magnetic flux to the magnetic recording medium, wherein the plasmon generator has a first surface that is positioned in the vicinity of the front end surface and a second surface that is positioned at the back side of the first surface relative to the down track direction;
the first surface tilts toward a surface that is orthogonal to the down track direction, and is parallel to the cross track direction; and
a portion between the first surface and the second surface of the plasmon generator is deposited with a (111) orientation from the first surface toward the second surface.

15. The method for manufacturing a magnetic recording element according to claim 14, further comprising:
depositing the lower layer from an NiO film with 50 nm or greater of film thickness by depositing an Ni layer and oxidizing the deposited Ni layer.

* * * * *